(12) United States Patent
Yu

(10) Patent No.: US 9,022,352 B2
(45) Date of Patent: May 5, 2015

(54) HARD SEAL PLUG VALVE

(75) Inventor: Shijun Yu, Shanghai (CN)

(73) Assignee: Shanghai Goldar Electric System Co., Ltd., Shanghai (CN)

(*) Notice: Subject to any disclaimer, the term of this patent is extended or adjusted under 35 U.S.C. 154(b) by 133 days.

(21) Appl. No.: 13/979,324

(22) PCT Filed: Apr. 10, 2011

(86) PCT No.: PCT/CN2011/072578
§ 371 (c)(1),
(2), (4) Date: Jul. 11, 2013

(87) PCT Pub. No.: WO2012/097546
PCT Pub. Date: Jul. 26, 2012

(65) Prior Publication Data
US 2013/0292593 A1 Nov. 7, 2013

(30) Foreign Application Priority Data
Jan. 20, 2011 (CN) .......................... 2011 1 0022586

(51) Int. Cl.
*F16K 5/00* (2006.01)
*F16K 31/44* (2006.01)
*F16K 31/53* (2006.01)
*F16K 5/02* (2006.01)
*F16K 27/06* (2006.01)

(52) U.S. Cl.
CPC ............. *F16K 31/535* (2013.01); *F16K 5/0242* (2013.01); *F16K 27/062* (2013.01)

(58) Field of Classification Search
USPC ........... 251/309, 215, 218, 226, 227, 229, 56, 251/187–188, 192, 264; 137/625.47
See application file for complete search history.

(56) References Cited

U.S. PATENT DOCUMENTS

| 1,756,650 | A | * | 4/1930 | Martin, Jr. ..................... 251/183 |
| 1,784,094 | A | * | 12/1930 | Fletcher ....................... 251/229 |
| 2,064,765 | A | * | 12/1936 | Powell et al. ................ 251/166 |
| 2,872,155 | A | * | 2/1959 | Hazard .......................... 251/165 |
| 4,293,117 | A | * | 10/1981 | Mueller ......................... 251/229 |
| 7,837,175 | B2 | * | 11/2010 | Stone et al. ................... 251/249 |
| 2012/0298894 | A1 | * | 11/2012 | Fuehrer ........................... 251/69 |

* cited by examiner

*Primary Examiner* — John K Fristoe, Jr.
*Assistant Examiner* — Michael R Reid
(74) *Attorney, Agent, or Firm* — Houtteman Law LLC

(57) ABSTRACT

The invention provides a hard seal plug valve, comprising a valve body, wherein a tapered plug is arranged in the valve body, a bonnet is arranged at an upper part of the valve body, a drive valve rod penetrates the bonnet, an elastic hold-down mechanism is sheathed on the drive valve rod and arranged on a plug bearing seat, the plug bearing seat is connected with the tapered plug, and the plug bearing seat is held down when the elastic hold-down mechanism extends; and the hard seal plug valve characterized in that a telescopic mechanism is sheathed on the drive valve rod, the plug bearing seat is pushed upward when the telescopic mechanism extends, a valve rod bearing seat is arranged at the bottom of the drive valve rod, ends of the valve rod bearing seat pass through a planetary reduction mechanism, and the tapered plug is connected with the planetary reduction mechanism and rotates with the drive valve rod by the planetary reduction mechanism. In the invention, the tapered plug can reliably float and rotate under any circumstances. The drive torque of the plug valve is at least 7 times less than that of a general plug valve, therefore, when a motor is used, a general valve requires 2 minutes from opening to closing, and the valve of the invention only requires 3.8 seconds.

11 Claims, 8 Drawing Sheets

HARD SEAL PLUG VALVE

FIELD OF THE INVENTION

The invention relates to a hard seal plug valve.

DESCRIPTION OF THE RELATED ART

Owning to simple structure, quick opening and closing and relatively small pressure drop, plug valves are widely applied to a certain extent. The plug valves are divided into hard seal plug valves and soft seal plug valves.

Sealing and lubricating films must be established between the tapered outer surface of an existing soft seal plug valve and the tapered inner surface of a valve cavity. Axial seal pressure is arranged at the large end of a tapered plug, and the tapered plug still keeps the same seal pressure during rotation, thus the rotating torque is large, and the sealing surface also suffers from serious wear. High-temperature impact and vibration will damage the lubricating film, so that the plug is attached to the valve cavity, and cannot be rotated, opened and closed. When in use, the tapered plug is off the valve cavity once because of high temperature and sudden pressure rise in the line, causing the medium in the line to flow into the seal cavity, possibly washing the seal film away.

Although the hard seal plug valve is not provided with a seal film, the rotating torque is very large, and the sealing surface suffers from more serious wear.

Plug valves with plug being lifted firstly and then pressed after rotation once occurred, such as lift plug valves and double-acting plug valves. However, both need more than two operating mechanisms or more than two actions, so that the valves are complex in structure and inconvenient to operate. Therefore, the improved plug valves are not widely applied.

Invention patent ZL200710046094 discloses a floating tapered plug valve with simple structure, and "lifting the plug firstly, and then pressing it after rotation" can be completed by only one action. Although the patent solves the sealing and switching problems well, but it also has the following problems:

Firstly, a compression spring is used as the device for floating the tapered plug before the valve switching. When the tapered plug is jammed (locked) by the sealing surface of the seal cavity, the compression spring has static elasticity only instead of impact force, and the jammed (locked) tapered plug can be removed from the valve cavity by a rising impact force, thus the use of compression spring cannot reliably float the tapered plug. Meanwhile, the spring is required to have certain elasticity to float the tapered plug, but the elasticity needs to be overcome while the tapered plug is pressed. If there is no spring causing the tapered plug to float, an axial force of 10000N is applied to press the tapered plug to the seal pressure. After the floating spring is arranged, if the elasticity of the compression spring is 20000N after compression, additional 20000N axial force plus 10000N axial force is required to overcome the elasticity of the spring. Total axial force of 30000N is thus required to press the tapered plug, and the force applied is 3 times of the original force, that is, the driving force required to drive the valve rod is increased by 2 times additionally.

Secondly, a torque limiter is used to rotate the tapered plug. That is, when the tapered plug floats, the torque for rotating the tapered plug is fixed. A higher torque will cause the drive valve rod to remove from the tapered plug and skid, and the drive valve rod continues rotation and presses the tapered plug. When the valve is switched to the closed condition from the open condition, a swirling moment occurs as dynamic pressure caused by the flow rate of the fluid will prevent change in direction of the channel of the tapered plug. The swirling moment is the resistance stopping rotation of the tapered plug, and is associated with the pressure and flow rate of the fluid. Therefore, the torque limiter with fixed torque cannot ensure reliable rotation of the tapered plug in general.

SUMMARY OF THE INVENTION

The purpose of the invention is to provide a plug valve capable of closing and opening the valve quickly and reliably.

In order to achieve the purpose above, the technical solution of the invention provides a hard seal plug valve. The hard seal plug valve comprises a valve body which comprises a first through channel and a second through channel for flowing of a medium, a tapered valve cavity communicated with the first through channel and the second through channel, and a plug through port communicated with the first through channel and the second through channel in an open condition. A rotatable tapered plug for blocking the first through channel and the second through channel in a closed condition is arranged in the tapered valve cavity. A bonnet assembly is arranged at the upper part of the valve body, and a drive valve rod penetrates the bonnet assembly. A valve rod bearing seat is arranged at the bottom of the drive valve rod. The hard seal plug valve is characterized in that a telescopic mechanism allowing the tapered plug to move upward and an elastic hold-down mechanism allowing the tapered plug to move toward the tapered valve cavity are sheathed on the drive valve rod. A plug bearing seat is connected with the tapered plug, and the telescopic mechanism extends when the elastic hold-down mechanism retracts due to rotation of the drive valve rod. The tapered plug is pushed upward by the plug bearing seat, and the telescopic mechanism retracts and the elastic hold-down mechanism extends due to continual rotation of the drive valve rod. The tapered plug is pressed toward the tapered valve cavity by the plug bearing seat to be under the seal pressure. The valve rod bearing seat is provided with an upper limiting shaft shoulder and a lower limiting shaft shoulder, and a part between the upper limiting shaft shoulder and the lower limiting shaft shoulder is tapped on the valve rod bearing seat. A sun gear is sheathed on the threads of the valve rod bearing seat, and an inner gear coplanar with the sun gear is connected to the upper part of the valve body. Two or three planet gears are arranged between the inner gear and the sun gear, and a planet gear rotating shaft at the middle of the planet gears is connected with the tapered plug. When the drive valve rod begins to rotate, the sun gear only rotates upward and downward, but does not transfer torque. Only after the tapered plug moves upward and the sun gear is limited by the upper limiting shaft shoulder or the lower limiting shaft shoulder, the drive valve rod drives the sun gear to rotate, and drives the tapered plug to rotate to a certain angle and limit the tapered plug. At this moment, the planet gears slip while the drive valve rod can continue to rotate till completion of opening and closing operation.

In the invention, the telescopic mechanism driven by threads is used to float the tapered plug. When the tapered plug is floating, a planetary reduction mechanism is used to rotate the tapered plug. After rotation, the tapered plug is pressed toward the valve cavity by the elastic hold-down mechanism and is under seal pressure, thus achieving reliable floating, rotation and sealing of the tapered plug in any case. The driving moment of the plug valve is at least 7 times less than that of a general plug valve. For example, a DN100 and 4.0 MPa common hard seal plug valve needs the driving moment of 150N·m generally, but the driving force of 20N·m is enough for the valve of the invention.

DESCRIPTION OF THE PREFERRED EMBODIMENTS

The invention is further described in combination with examples as follows.

Example 1

Figure 1:
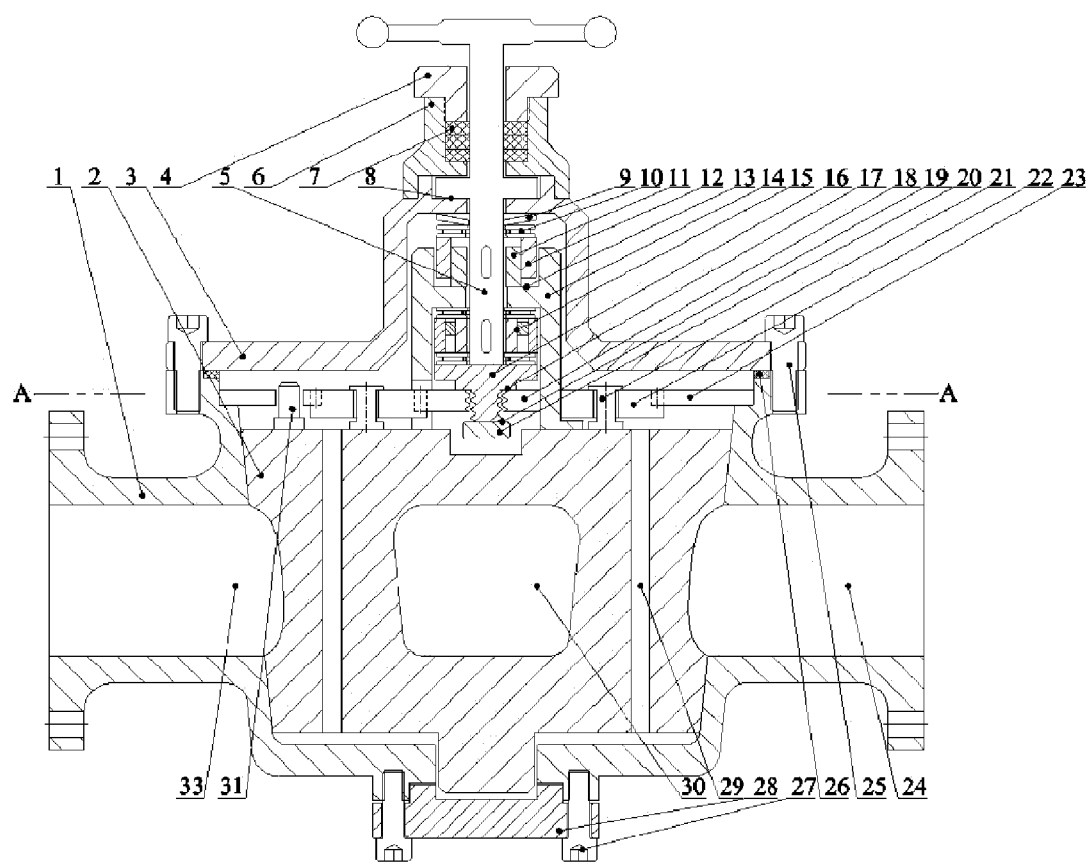
FIG. 1 is a schematic diagram of a hard seal plug valve in a closed condition.
Figure 2:
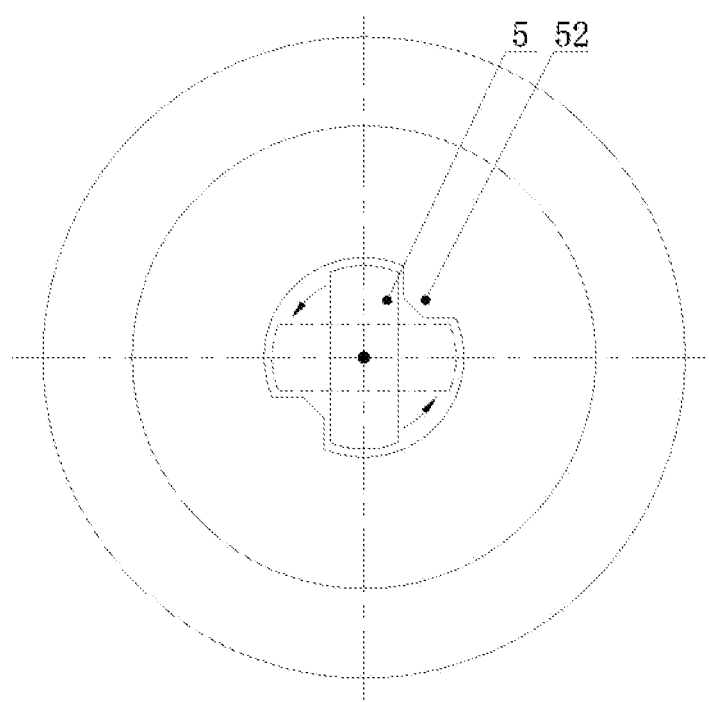
FIG. 2 is a schematic diagram of fit between a drive valve rod and an inner screw rod of a telescopic mechanism.

The invention provides a hard seal plug valve, and the work process is generally as follows: a plug valve shown in FIG. 1 is in off state, and a plug through port 30 at the middle of a tapered plug 2 is communicated with a first through channel 33 and a second through channel 24 of a valve body 1 at the moment. When the plug valve is opened, a drive valve rod 5 is rotated anticlockwise and an elastic hold-down mechanism retracts intermediately. FIG. 2 shows that the drive valve rod 5 is in clearance fit with an inner screw rod 52 of a telescopic mechanism 15. When elastic stroke of a disk spring 9 of the elastic hold-down mechanism extends to fully relaxed condition, the inner screw rod 52 of the telescopic mechanism 15 starts to rotate anticlockwise with the drive valve rod 5, and the telescopic mechanism 15 starts to extend to push upward the plug bearing seat 14, thus driving the tapered plug 2 upward. The drive valve rod 5 is continuously rotated anticlockwise when the tapered plug rises to a certain position, the tapered plug 2 is driven by a planetary reduction mechanism, both ends of the plug through port 30 are aligned with the first through channel 33 and the second through channel 24 respectively, the telescopic mechanism 15 retracts at the same time, while the elastic hold-down mechanism extends to press the plug bearing seat 14 so as to drive the tapered plug 2 down until the tapered plug 2 drops in place, then the valve is opened. The structure of the invention is further described below in combination with the drawings.

Figure 3:
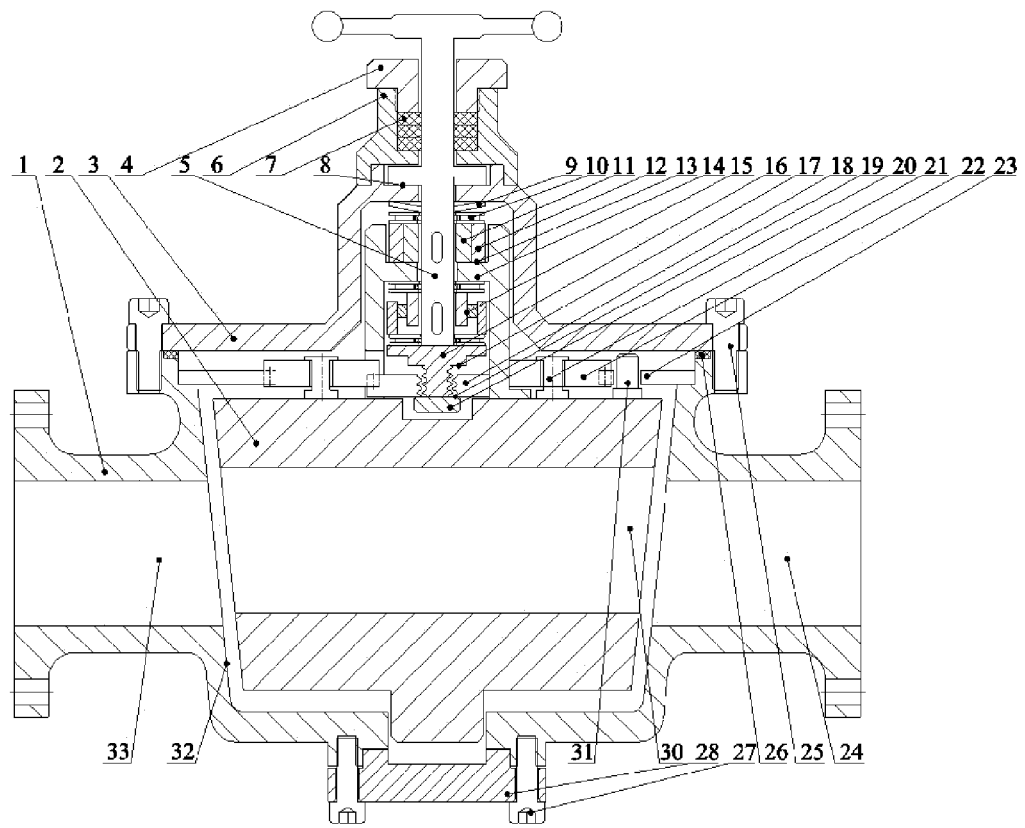
FIG. 3 is a schematic diagram of the hard seal plug valve in an intermediate condition when the plug has been turned.

FIG. 1 and FIG. 3 show that the hard seal plug valve of the invention comprises the valve body 1. The first through channel 33 and the second through channel 24 for flow of the medium are arranged on the left and right sides of the valve body 1, and a tapered valve cavity 32 communicated with the first through channel 33 and the second through channel 24 is arranged in the valve body 1. A valve body bearing seat 3 is arranged on the top of the valve body 1 by bonnet locking screws 25 on both sides. A flange locking gasket 26 is arranged between the valve body 1 and the valve body bearing seat 3. A valve body flange 28 is fixed at the bottom of the valve body 1 by a valve body flange locking screw 27. A bonnet 6 is arranged on the valve body bearing seat 3, a lock nut 4 is inserted into the top end of the bonnet 6, and a seal assembly 7 is arranged between the lock nut 4 and the bonnet 6. The tapered plug 2 is arranged in the tapered valve cavity 32 of the valve body 1, and the plug through port 30 is arranged at the middle of the tapered plug 2. The plug through port 30 is communicated with the first through channel 33 and the second through channel 24 when the valve is in open condition. Balance holes 29 are arranged on both sides of the plug through port 30. The tapered plug 2 can float up and down and rotate in the tapered valve cavity 32. The first through channel 33 and the second through channel 24 are blocked by the tapered plug 2 when the valve is in closed condition. The drive valve rod 5 is arranged in the valve body bearing seat 3 after passing through the lock nut 4, the bonnet 6 and the seal assembly 7.

Figure 4:
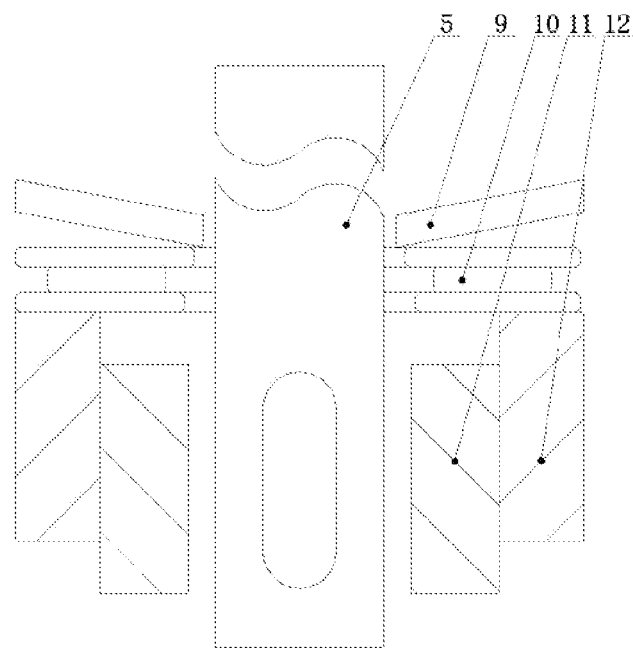
FIG. 4 is a schematic diagram of fit of an elastic hold-down mechanism.

FIG. 4 shows that the elastic hold-down mechanism is sheathed on the drive valve rod 5. The elastic hold-down mechanism comprises an inner hold-down housing 11. The inner hold-down housing 11 is sheathed on the drive valve rod 5, and an outer hold-down housing 12 is sheathed on the inner hold-down housing 11. The inner hold-down housing 11 is coordinated with the outer hold-down housing 12 by a thread pair. Needle bearings 10 are arranged on the inner hold-down housing 11 and the outer hold-down housing 12. The needle bearings 10 are sheathed on the drive valve rod 5. The disk spring 9 is arranged between the needle bearings 10 and the valve body bearing seat 3. The inner hold-down housing 11 and the outer hold-down housing 12 are arranged on the plug bearing seat 14, and the plug bearing seat 14 is connected with the tapered plug 2.

Figure 5A:
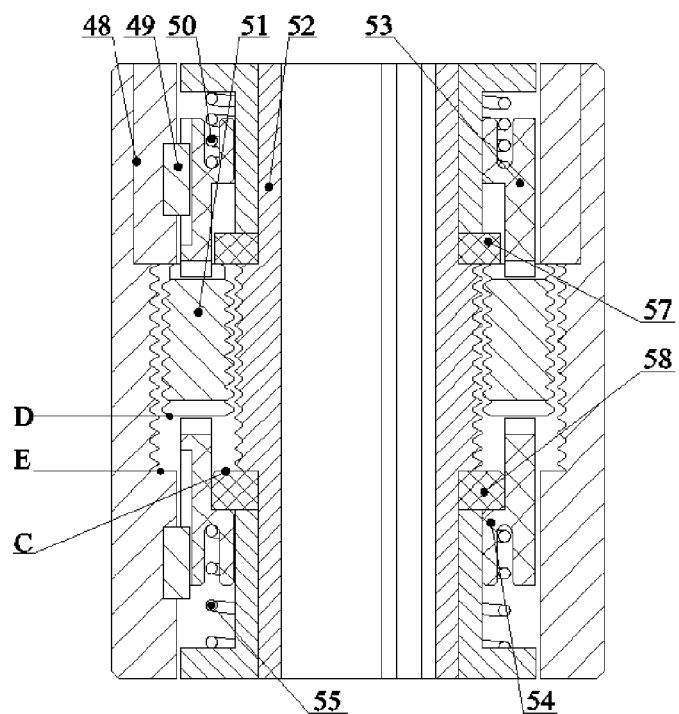
FIG. 5A is a sectional view of the telescopic mechanism.
Figure 5B:
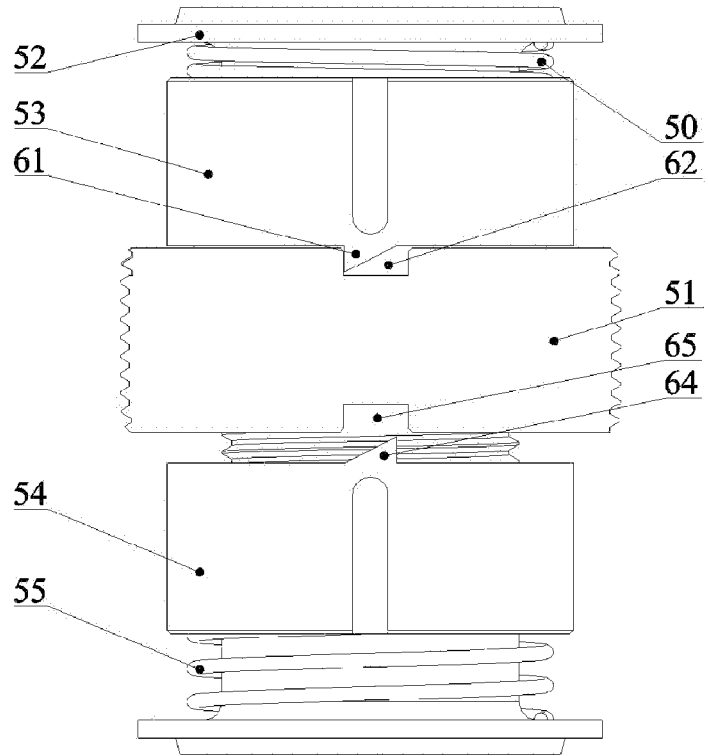
FIG. 5B is a schematic diagram of several assemblies of the telescopic mechanism.
Figure 6A:
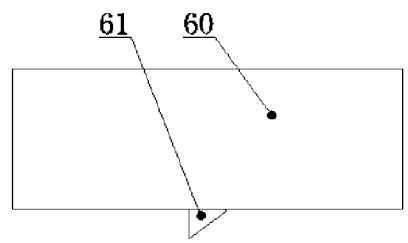
FIG. 6A is a front view of an orthohexagonal upper switching pin.
Figure 6B:
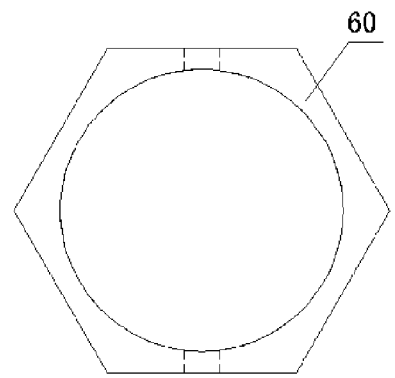
FIG. 6B is a top view of the orthohexagonal upper switching pin.
Figure 7A:
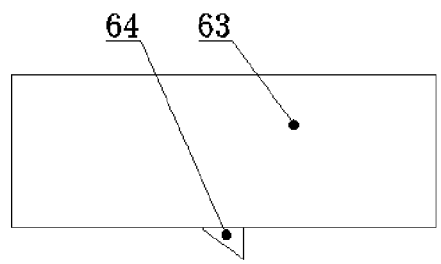
FIG. 7A is a front view of an orthohexagonal lower switching pin.
Figure 7B:
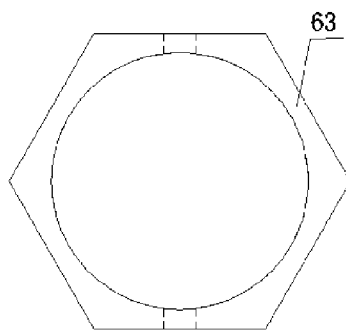
FIG. 7B is a top view of the orthohexagonal lower switching pin.
Figure 8A:
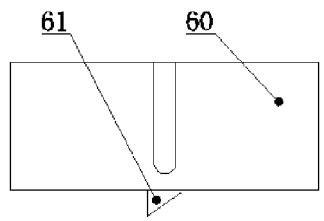
FIG. 8A is a front view of a circular upper switching pin.
Figure 8B:
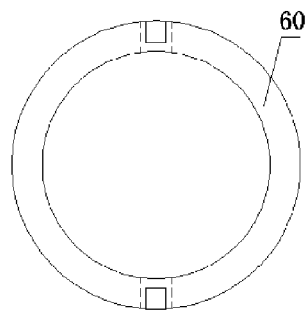
FIG. 8B is a top view of the circular upper switching pin.
Figure 9A:
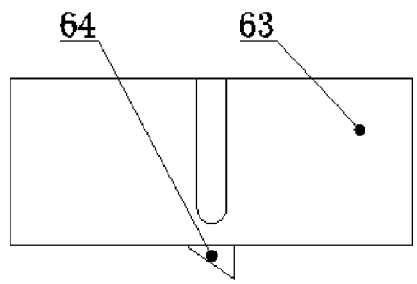
FIG. 9A is a front view of a circular lower switching pin.
Figure 9B:
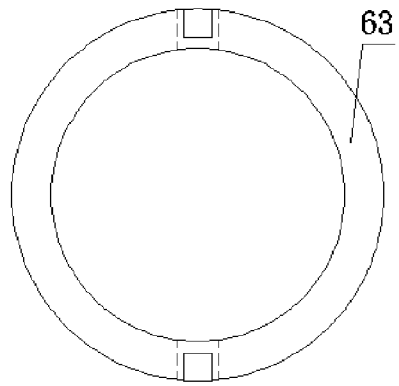
FIG. 9B is a top view of the circular lower switching pin.

FIG. 5A and FIG. 5B show that the telescopic mechanism 15 is arranged outside the drive valve rod 5. The telescopic mechanism 15 comprises a liner 51 with inner thread and outer thread on both sides, the inside and the outside of the liner 51 are provided with inner screw rods 52 and housings 48 respectively, and the liner 51 is arranged between the inner screw rod 52 and the housing 48 by a key. The inner screw rod 52 is sheathed on the drive valve rod 5. The middle part of the inner screw rod 52 is an inner hole with a key slot in clearance fit with the drive valve rod 5 with a key pin. The inner screw rod 52 is driven to rotate with the drive valve rod 5, but its axial movement is not limited. The first thread with an upper shaft shoulder 57 and a lower shaft shoulder 58 is arranged on the outside of the inner screw rod 52. The first thread is a clockwise thread. The second thread with the upper and lower shaft shoulders are arranged on the inside of the housing 48. The inside and the outside of the housing 51 are provided with inner thread and outer thread respectively. The outer housing 48 is sheathed on the liner 51 and coordinated with the outer thread of the liner 51. The upper and lower shaft shoulders of the outer housing 48 can limit the movement range of the liner 51. The length and pitch of the thread between the upper and lower shaft shoulders are equal to the length and pitch of the outer thread of the inner screw rod 52. The inner thread of the liner 51 is coordinated with the first thread of the inner screw rod 52 and is short screw only moving between the upper shaft shoulder 57 and the lower shaft shoulder 58 of the inner screw rod 52. The outer thread and the inner thread of the liner 51 have equal pitch but opposite rotation directions. Therefore, the first thread and the inner thread form a first thread pair, the second thread and the outer thread form a second thread pair, and the rotation directions of the first thread pair and the second thread pair are opposite. A rotating downward caging device 53 and a rotating upward caging device 54 are arranged between the outer housing 48 and the inner screw rod 52. The rotating downward caging device 53 and the rotating upward caging device 54 are arranged above and blow the liner 51 respectively. The upper and lower ends of the inner part of the outer housing 48 are provided with key slots which are similar to the rotating downward caging device 53 and the rotating upward caging device 54 in shape, and cause the rotating downward caging device 53 and the rotating upward caging device 54 sheathed in the outer housing 48 to fail to relatively rotate. The shape of the outer part of the outer housing 48 can limit its rotation and prevent rotation of the outer housing 48 in coordination with the plug bearing seat 14. The rotating downward caging device 53 and the rotating upward caging device 54 are two heads sheathed on the inner screw rod 52 and in the liner 51.

The rotating downward caging device 53 comprises an upper switching pin 60. The bottom of the upper switching pin 60 is provided with an upper fixture block 61. An upper insertion slot 62 is arranged on the upper edge of the liner 51. The upper insertion slot 62 is coordinated with the upper fixture block 61 so that the liner 51 can not rotate anticlockwise but can rotate clockwise. A first spring 50 is connected between the upper switching pin 60 and the inner screw rod 52. The rotating upward caging device 54 comprises a lower switching pin 63. The bottom of the lower switching pin 63 is provided with a lower fixture block 64. A lower insertion slot 65 is arranged on the lower edge of the liner 51. The lower insertion slot 65 is coordinated with the lower fixture block 64 so that the liner 51 can not rotate clockwise but can rotate anticlockwise. A second spring 55 is connected between the lower switching pin 63 and the inner screw rod 52. Either of the upper switching pin 60 and the lower switching pin 63 of the rotating downward caging device 53 and the rotating upward caging device 54 is blocked in the slot of the liner 51 under the action of the first spring 50 and the second spring 55.

The inner walls of the upper switching pin 60 and the lower switching pin 63 are a-step shape. The upper part of the inner screw rod 52 is provided with the upper shaft shoulder 57 which is coordinated with the step-shaped inner wall of the upper switching pin 60. The lower shaft shoulder 58 is arranged on the lower part of the inner screw rod 52, and the lower shaft shoulder 58 is coordinated with the step-shaped inner wall of the lower switching pin 63.

If the first thread between the upper shaft shoulder 57 and the lower shaft shoulder 58 of the inner screw rod 52 is a clockwise thread with length L and the length of the liner 51 is T, the inner thread of the liner 51 is also a clockwise thread and the outer thread must be the anticlockwise thread, T must be less than L, and the pushed upward stroke S of the whole telescopic mechanism 13 is L−T.

When the telescopic mechanism 15 is in the condition as shown in FIG. 5B, the upper fixture block 61 of the upper switching pin 60 is blocked in the upper insertion slot 62 of the liner 51, and the step-shaped inner wall in the lower switching pin 63 is blocked by the inner screw rod 52, so the lower fixture block 64 is separated from the lower insertion slot 65 of the liner 51. And the drive valve rod 5 is rotated anticlockwise. When the drive valve rod 5 is in clearance fit with the inner screw rod 52 through rotation, the inner screw rod 52 is driven to rotate with the drive valve rod 5 anticlockwise. As the upper fixture block 61 is blocked in the upper insertion slot 62 of the liner 51 and the liner 51 rotates anticlockwise, the second thread pair does not work. At the same time, the inner screw rod 52 rises under the action of the first thread pair. The upper switching pin 60 is driven upward after the upper shaft shoulder 57 of the inner screw rod 52 contacts the step-shaped inner wall of the upper switching pin 60. When the inner screw rod 52 rises until the lower end surface D of the liner 51 is in contact with the end surface of the lower shaft shoulder 58 of the inner screw rod 52, the upper fixture block 61 is completely separated from the upper insertion slot 62, the liner 51 can rotate anticlockwise, and the lower fixture block 64 can be blocked in the lower insertion slot 65 (ready for clockwise rotation of the drive valve rod 5). The drive valve rod 5 is continuously rotated. As movement of the first thread pair is limited by the end surface of a lower lug 58 of the inner screw rod 52, the inner screw rod 52 drives the liner 51 to drop with the liner 51 under the action of the second thread pair until the lower end surface D of the liner 52 is in contact with the surface E of the lower shaft shoulder of the outer housing 48. Then the inner screw rod 52 is flush with the outer housing 48 to complete an extension and retraction process.

In order to ensure that the upper switching pin 60 and the lower switching pin 63 will not rotate relative to the outer housing 48, the outer walls of the upper switching pin 60 and the lower switching pin 63 can be designed to be regular polygon as shown in FIG. 6A to FIG. 7B. Then the inner wall of the outer housing 48 without the second thread on both ends is a regular polygon which is coordinated with the shape of the outer walls of the upper switching pin 60 and the lower switching pin 63.

If the outer walls of the upper switching pin 60 and the lower switching pin 63 are circular, as shown in FIG. 8A to FIG. 9B, straight stroke groove is arranged on the outer walls of the upper switching pin 60 and the lower switching pin 63, and one side of an outer housing transmission flat key 49 is arranged in the straight stroke groove, while the other side is fixed onto the inner wall of the outer housing 48.

FIG. 1 and FIG. 3 show that a valve rod bearing seat 16 is arranged at the bottom of the drive valve rod 5, and a thread with an upper limiting shaft shoulder 17 and a lower limiting shaft shoulder 19 is set at the bottom of the valve rod bearing seat 16. The thread passes through the planetary reduction mechanism. The tapered plug 2 is connected with the planetary reduction mechanism and rotates with the drive valve rod 5 along with the planetary reduction mechanism. When the drive valve rod 5 rotates until the elastic hold-down mechanism retracts entirely, the telescopic mechanism 15 totally extends and drives the tapered plug 2 upward to the highest position, and the upper limiting shaft shoulder 17 obstructs the sun gear 18 of the planetary reduction mechanism, thus driving the sun gear 18 to rotate. When the drive valve rod 5 rotates in an opposite direction until the elastic hold-down mechanism retracts entirely, the telescopic mechanism 15 totally extends and drives the tapered plug 2 upward to the highest position, and the lower limiting shaft shoulder 19 obstructs the sun gear 18 of the planetary reduction mechanism.

Figure 10:
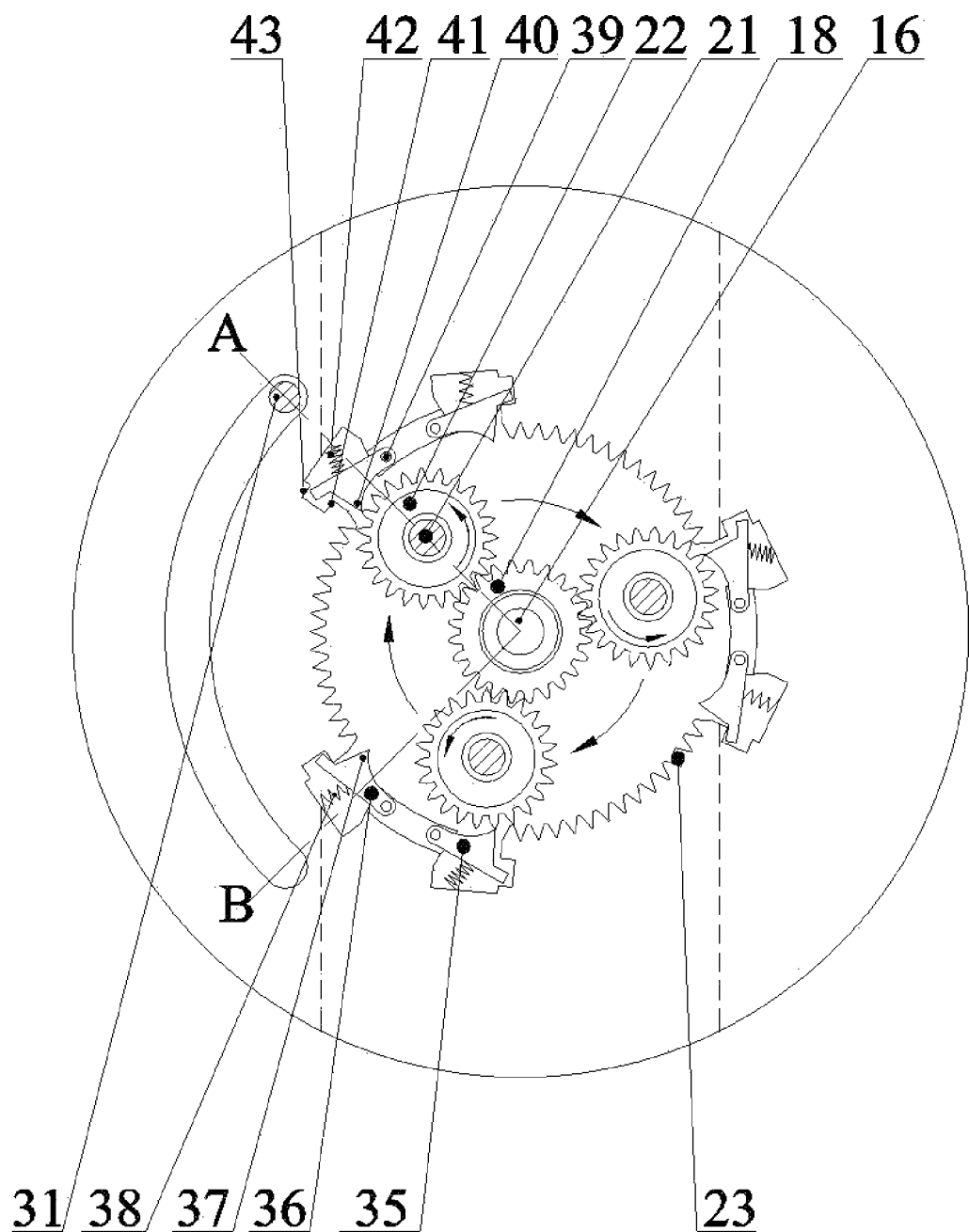
FIG. 10 is a structural diagram of a planetary reduction mechanism when the valve is closed after the drive valve rod rotates clockwise.

In combination with FIG. 10, the planetary reduction mechanism comprises the sun gear 18. The sun gear 18 is sheathed on the thread between the upper limiting shaft shoulder 17 and the lower limiting shaft shoulder 19. When the drive valve rod 5 starts rotation, the sun gear 18 rotates upward and downward only without torque transmission. Only when the rotation between the sun gear 18 and the drive valve rod 5 is limited by the upper limiting shaft shoulder 17, the drive valve rod 5 drives the sun gear 18 to rotate. An inner gear 23 is fixedly arranged at the upper part of the valve body 1 coplanar with the sun gear 18. Three planet gears 22 engaged with the inner gear 23 and the sun gear 18 are arranged between inner gear 23 and the sun gear 18, and a planet gear rotating shaft 21 connected with the tapered plug 2 is arranged among the planet gears 22. Three continuous tooth sections with the same stroke are arranged on the inner gear 23, and a planet gear 22 is engaged onto each continuous tooth section which is provided with 2 movable tooth assemblies.

For the purpose of limiting, an arc stroke groove is arranged on the inner gear 23, and a valve core limiting pin 31 fixed on the tapered plug 2 is arranged in the arc stroke groove. Radian of the arc stroke groove is equivalent to the rotation angle required for the tapered plug 2 from the open condition to the closed condition or from the closed condition to the open condition (generally 90°).

The movable tooth assembly comprises a first movable tooth 40 and a second movable tooth 37. The first movable tooth 40 is arranged symmetrical with the second movable tooth 37. The first movable tooth 40 and the second movable tooth 37 rotate around a movable gear shaft 39. A first movable tooth spring 42 and a second movable spring 38 are connected with the first movable tooth 40 and the second movable tooth 37 separately. A first limit stop 41 and a second limit stop 43 are arranged above and below the ends of the first movable tooth 40 and the second movable tooth 37 separately.

The drive valve rod 5 drives the sun gear 18 to rotate clockwise, and the sun gear 18 drives the planet gears 22 to rotate anticlockwise and the tapered plug 2 to rotate clockwise to point A. Then the teeth of planet gears 22 and the first movable tooth 40 slip, and planet gears 22 only rotate without driving the tapered plug 2. Similarly, the second movable tooth 37 slips while the drive valve rod 5 drives the tapered plug 2 to point B when the sun gear 18 to rotates anticlockwise.

In combination with the drawings, the whole process from the open to closed condition of the hard seal plug valve provided by the invention is described below: as shown in FIG. 1, after the drive valve rod 5 is rotated clockwise to the bottom, the plug valve is in off condition. The inner hold-down housing 11 and the outer hold-down housing 12 then stagger and extend, while the outer housing 48 is level with the inner screw rod 52, and a certain stroke is reserved between the lower limiting shaft shoulder 19 and the sun gear 18. After the drive valve rod 5 is rotated anticlockwise, driven by the drive valve rod 5, the inner hold-down housing 11 rotates upward relative to the outer hold-down housing 12, and the elastic hold-down mechanism retracts, while the inner screw rod 52 rotates upward by the drive valve rod 5 and push upward the plug bearing seat 14, thus driving the tapered plug 2 to move upward. When the drive valve rod 5 is rotated until the elastic hold-down mechanism retracts entirely, the inner screw rod 52 rotates upward and drives the tapered plug 2 to the highest position. The lower limiting shaft shoulder 19 obstructs the sun gear 18 so as to drive the sun gear 18 to rotate anticlockwise and drive the planet gears 22 to rotate clockwise and revolves anticlockwise around the sun gear 18, thus driving the tapered plug 2 to rotate. The tapered plug 2 is rotated from point A to point B. The valve core limiting pin 31 fixed onto the tapered plug 2 is moves to the position due to limitation by the arc stroke groove arranged on the inner gear 23. Then the plug through port 30 on the tapered plug 2 is aligned with the first through channel 33 and the second through channel 24 on both ends. As shown in FIG. 3, the plug valve is opened, the teeth of the planet gears 22 and the second movable tooth 37 slip, and the plant gears 22 rotate only without driving the tapered plug 2. Meanwhile, the lower lug of the inner screw rod 52 is obstructed by the lower end surface D of the liner 51. The inner screw rod 52 drives the liner 51 to rotate downward, and the telescopic mechanism 15 starts retraction and the elastic hold-down mechanism starts extension again until the inner screw rod 52 is level with the outer housing 48 and the inner hold-down housing 11 and the outer hold-down housing 12 stagger and extend to the maximum position. Then the tapered plug 2 is totally blocked in the tapered valve cavity 32 of the valve body 1. If the plug valve needs to be closed, the drive valve rod 5 is rotated clockwise according to the same principle to open the valve.

Example 2

Figure 11:
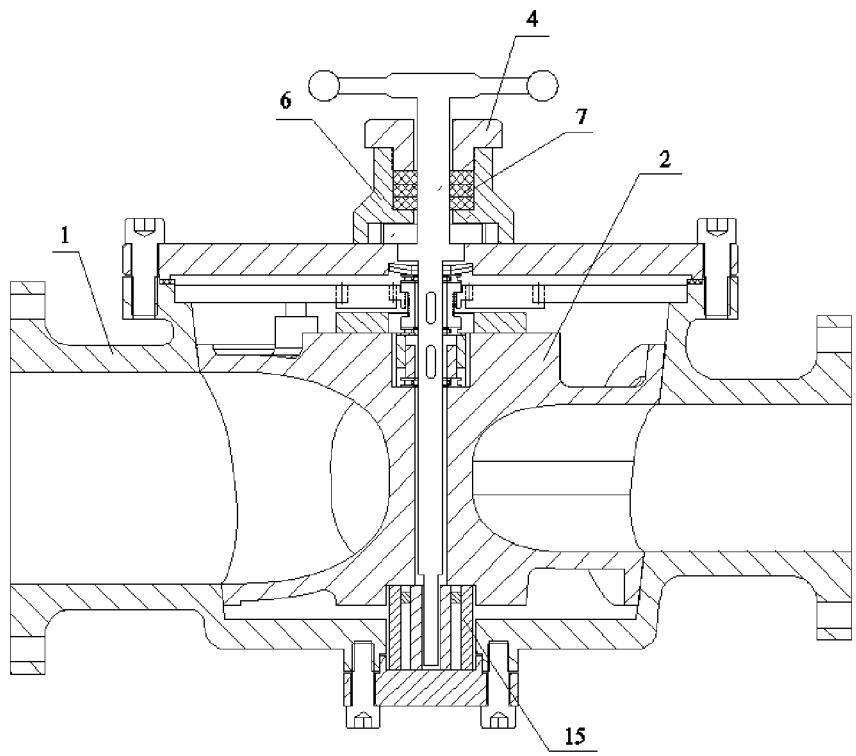
FIG. 11 is a schematic diagram of a four-way plug valve with the telescopic mechanism arranged below the tapered plug.

FIG. 11 is a schematic diagram of a four-way plug valve when a telescopic mechanism is arranged below the tapered plug. The difference between the plug valve in this example and the plug valve in example 1 is that the telescopic mechanism 15 is arranged below the tapered plug 2 while the tapered plug 2 has a four-way channel in coordination with the valve body 1. Other mechanisms and their principles are the same as example 1.

Example 3

Figure 12:
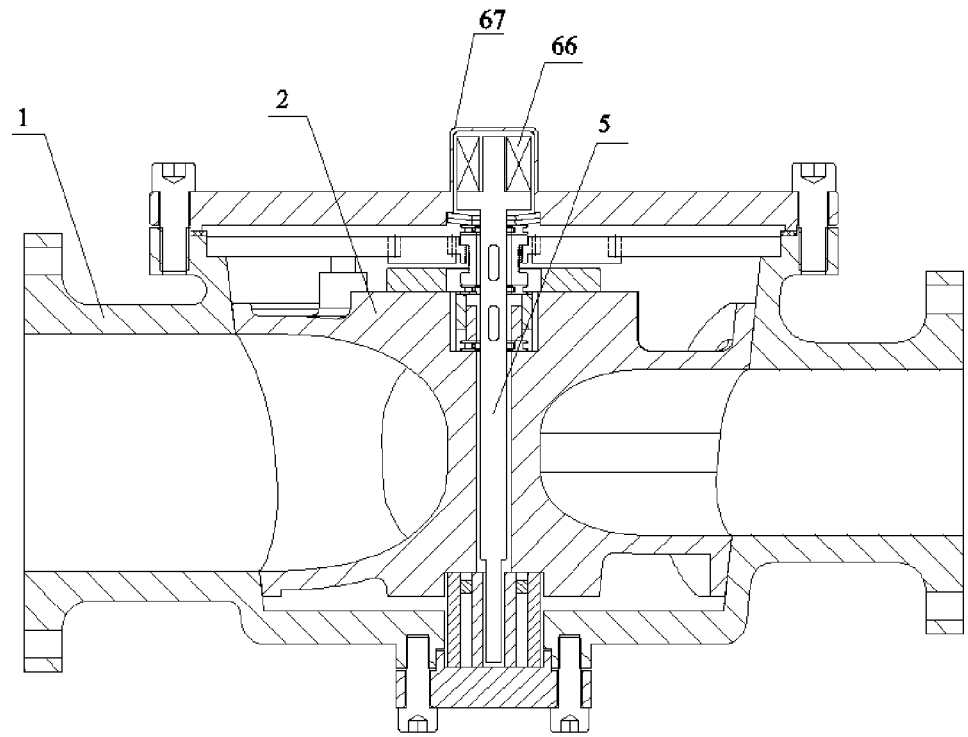
FIG. 12 is a schematic diagram of the four-way plug valve with the telescopic mechanism driven by magnetic induction arranged below the tapered plug.

As shown in FIG. 12, the difference between this example and example 2 is that the mechanism is driven by magnetic induction, that is, a ring of magnet 66 is arranged around the drive valve rod 5 at the top end of the drive valve rod 5 and is covered by a shielding cover 67. The shielding cover 67 is made of a nonmagnetic material like stainless steel, copper or plastic so that the magnetic force of the magnet 66 will not be obstructed. In use, a ring of magnet is arranged outside the shielding cover 67. The magnet inside the shielding cover 67 corresponds to the magnet outside the shielding cover but they have opposite polarity. When the magnet outside the shielding cover 67 rotates, it drives the magnet 66 in the shielding cover 67 to rotate, thus driving the drive valve rod 5 to rotate and achieve magnetic induction. Other mechanisms of this example and their principles are the same as example 1.

The invention claimed is:

1. A hard seal plug valve, comprising a valve body (1), wherein the valve body (1) comprises a first through channel (33) and a second through channel (24) for flow of a medium; a tapered valve cavity (32) communicated with the first through channel (33) and the second through channel (24), and a plug through port (30) communicated with the first through channel (33) and the second through channel (24) in an open condition, a rotatable tapered plug (2) for blocking the first through channel (33) and the second through channel (24) in a closed condition is arranged in the tapered valve cavity (32), a bonnet assembly is arranged at an upper part of the valve body (1), a drive valve rod (5) penetrates the bonnet assembly, and a valve rod bearing seat (16) is arranged at the bottom of the drive valve rod (5); and the hard seal plug valve characterized in that a telescopic mechanism (15) allowing the tapered plug (2) to move upward and an elastic hold-down mechanism allowing the tapered plug (2) to move toward the tapered valve cavity (32) are sheathed on the drive valve rod (5), a plug bearing seat (14) is connected with the tapered plug (2), the telescopic mechanism (15) extends when the elastic hold-down mechanism retracts due to rotation of the drive valve rod (5), the tapered plug (2) is pushed upward by the plug bearing seat (14), and the telescopic mechanism (15) retracts and the elastic hold-down mechanism extends due to continual rotation of the drive valve rod (5), the tapered plug (2) is held down to the tapered valve cavity (32) by the plug bearing seat (14) and subject to seal pressure, the valve rod bearing seat (16) is provided with an upper limiting shaft shoulder (17) and a lower limiting shaft shoulder (19), and threads are provided at a part between the upper limiting shaft shoulder (17) and the lower limiting shaft shoulder (19) on the valve rod bearing seat (16), a sun gear (18) is sheathed on the threads of the valve rod bearing seat (16), an inner gear (23) coplanar with the sun gear (18) is connected to the upper part of the valve body (1), three planet gears (22) are arranged between the inner gear (23) and the sun gear (18), a planet gear rotating shaft (21) at the middle of the planet gears (22) is connected with the tapered plug (2), when the drive valve rod (5) begins to rotate, the sun gear (18) only rotates upward and downward, but does not transfer torque, only after the tapered plug (2) moves upward and the sun gear (18) is limited by the upper limiting shaft shoulder (17) or the lower limiting shaft shoulder (19), the drive valve rod (5) drives the sun gear (18) to rotate, and drives the tapered plug (2) to rotate to a certain angle and limit the tapered plug (2), at this moment, the planet gears (22) slip while the drive valve rod (5) can continue to rotate till completion of an opening and closing operation.

2. The hard seal plug valve of claim 1, characterized in that the telescopic mechanism (15) comprises a liner (51) with an inner thread and an outer thread at the inside and outside thereof, an inner screw rod (52) and an outer housing (48) are respectively arranged at the inside and outside of the liner (51), a first thread is provided at the outside of the inner screw rod (52), a second thread is provided at the inside of the outer housing (48), the first thread and the inner thread form a first thread pair, the second thread and the outer thread form a second thread pair, the first thread pair and the second thread pair advance in opposite directions, and a rotating downward caging device (53) and a rotating upward caging device (54) are arranged between the outer housing (48) and the inner screw rod (52) above and below the liner (51) respectively.

3. The hard seal plug valve of claim 2, characterized in that an upper shaft shoulder (57) and a lower shaft shoulder (58) are arranged at opposite ends of the first thread at the outside of the inner screw rod (52), the first thread has the same length as that of the second thread at the inside of the outer housing (48), and the length of the threads are larger than that of the liner (51).

4. The hard seal plug valve of claim 2, characterized in that the rotating downward caging device (53) comprises an upper switching pin (60), an upper fixture block (61) is arranged at the bottom of the upper switching pin (60), an upper insertion slot (62) is arranged at an upper edge of the liner (51), and the upper insertion slot (62) is coordinated with the upper fixture block (61) to completely clamp rotation of the inner screw rod (52) in a direction; and the rotating upward caging device (54) comprises a lower switching pin (63), a lower fixture block (64) is arranged at the upper part of the lower switching pin (63), a lower insertion slot (65) is arranged at a lower edge of the liner (51), and the lower insertion slot (65) is coordinated with the lower fixture block (64) to completely clamp rotation of the liner (51) in a direction.

5. The hard seal plug valve of claim 4, characterized in that an inner wall of the upper switching pin (60) is of a step shape, an upper shaft shoulder (57) is coordinated with the inner screw rod (52) in upward rotation to separate the upper fixture block (61) from the upper insertion slot (62) at the maximum stroke, and the lower fixture block (64) and the lower insertion slot (65) are completely clamped at this moment; and an inner wall of the lower switching pin (63) is also of a step shape, a lower shaft shoulder (58) is coordinated with the inner screw rod (52) in downward rotation to separate the lower fixture block (64) from the lower insertion slot (65) at the maximum stroke, and the upper fixture block (61) and the upper insertion slot (62) are completely clamped at this moment.

6. The hard seal plug valve of claim 4, characterized in that an outer wall of the upper switching pin (60) or the lower switching pin (63) is of regular polygon or circular shape, when the outer wall of the upper switching pin (60) or the lower switching pin (63) is of regular polygon shape, both ends of the outer housing (48) are of the same regular polygon shape with the shape of the inner wall of the outer housing without the second thread being matched with that of the outer wall of the upper switching pin (60) or the lower switching pin (63); when the outer wall of the upper switching pin (60) or the lower switching pin (63) is of circular shape, a straight stroke groove is arranged on the outer wall of the upper switching pin (60) or the lower switching pin (63), one side of an outer housing transmission flat key (49) is arranged in the straight stroke groove, and the other side is fixed on an inner wall of the outer housing (48).

7. The hard seal plug valve of claim 1, characterized in that the inner gear (23) is provided with continuous teeth corresponding to the planet gears (22) and having the same stroke, each continuous tooth section is engaged with one planet gear (22) and provided with a first movable tooth (40) and a second movable tooth (37), the first movable tooth (40) and the second movable tooth (37) are symmetrically arranged and rotate around a movable gear shaft (39), a first movable tooth spring (42) and a second movable tooth spring (38) are respectively connected to the first movable tooth (40) and the second movable tooth (37), and a first limit stop (41) and a second limit stop (43) are respectively arranged above and below ends of the first movable tooth (40) and the second movable tooth (37).

8. The hard seal plug valve of claim 7, characterized in that an arc stroke groove is arranged on the inner gear (23), a valve core limiting pin (31) fixed on the tapered plug (2) is arranged in the arc stroke groove, and a radian of the arc stroke groove is the same as the rotation angle required for the tapered plug (2) from opening to closing or from closing to opening.

9. The hard seal plug valve of claim 1, characterized in that the valve body (1) has two channels.

10. The hard seal plug valve of claim 1, characterized in that the telescopic mechanism (15) is arranged below the tapered plug (2).

11. The hard seal plug valve of claim 1, characterized in that a ring of magnet (66) is arranged around the drive valve rod (5) at the top end of the drive valve rod (5), and the magnet (66) is covered by a shielding cover (67).

* * * * *